United States Patent
Hardy et al.

(10) Patent No.: US 11,633,865 B2
(45) Date of Patent: Apr. 25, 2023

(54) MECHANICALLY ACTUATED END OF ARM TOOLING DEVICE

(71) Applicant: Ford Global Technologies, LLC, Dearborn, MI (US)

(72) Inventors: Evan Lovell Hardy, Ann Arbor, MI (US); Bradley Sochacki, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 17/219,919

(22) Filed: Apr. 1, 2021

(65) Prior Publication Data

US 2022/0314465 A1 Oct. 6, 2022

(51) Int. Cl.
*B25J 15/10* (2006.01)
*B25J 15/08* (2006.01)

(52) U.S. Cl.
CPC ........... *B25J 15/103* (2013.01); *B25J 15/083* (2013.01)

(58) Field of Classification Search
CPC ...... B25J 15/022; B25J 15/024; B25J 15/083; B25J 15/103; B25B 5/12
USPC ...................................... 294/104, 110.1, 115
See application file for complete search history.

(56) References Cited

U.S. PATENT DOCUMENTS

| | | | | |
|---|---|---|---|---|
| 792,945 A * | 6/1905 | Tally | | |
| 2,333,351 A * | 11/1943 | Welch | ....................... | B66C 1/48 294/104 |
| 2,415,145 A * | 2/1947 | Mollenhour | ............ | A61F 2/588 623/64 |
| 2,618,505 A * | 11/1952 | Rosenbaum | .............. | B66C 1/48 294/104 |
| 2,654,630 A * | 10/1953 | Renfroe | .................... | B66C 1/48 294/104 |
| 3,013,517 A * | 12/1961 | Isham | .................... | F16B 45/021 114/221 R |
| 3,479,078 A * | 11/1969 | Doty | ....................... | B66C 1/422 294/104 |
| 4,878,705 A | 11/1989 | Arnquist | | |
| 5,938,259 A * | 8/1999 | Sawdon | ............... | B25J 15/0226 294/203 |
| 6,079,896 A * | 6/2000 | Dellach | ................... | B25B 5/087 403/322.3 |
| 7,255,381 B2 * | 8/2007 | Komizo | .................... | B66C 1/36 294/82.19 |

(Continued)

FOREIGN PATENT DOCUMENTS

| CN | 104690586 | | 6/2015 |
|---|---|---|---|
| CN | 105945974 A | * | 9/2016 |

(Continued)

*Primary Examiner* — Dean J Kramer
(74) *Attorney, Agent, or Firm* — Burris Law, PLLC

(57) ABSTRACT

A mechanical device for grasping an object includes a lower arm defining a proximal end portion, a distal end portion, an inner profile, and at least one track disposed along a portion of the lower arm between the proximal end portion and the distal end portion. An upper arm is pivotally connected to the lower arm, the upper arm defining a proximal end portion, a distal end portion, and an inner profile. An actuator is pivotally connected to the proximal end portion of the upper arm, the actuator including at least one protrusion slidably disposed within the track of the lower arm.

18 Claims, 5 Drawing Sheets

(56) References Cited

U.S. PATENT DOCUMENTS

2006/0087138 A1* 4/2006 Migliori ................ B23K 37/04
                                                        294/104
2020/0206956 A1* 7/2020 Smith .................. B25J 15/0608

FOREIGN PATENT DOCUMENTS

CN       108115717       6/2018
CN       108748244       11/2018

* cited by examiner

MECHANICALLY ACTUATED END OF ARM TOOLING DEVICE

FIELD

The present disclosure relates to tooling devices, and more particularly to tooling devices for grabbing objects.

BACKGROUND

The statements in this section merely provide background information related to the present disclosure and may not constitute prior art.

A powered exoskeleton, also known as an exo-suit, is a wearable mobile apparatus that is powered by electric motors, pneumatics, levers, hydraulics or a combination thereof to aid a wearer in his/her limb movement with increased strength and endurance. For example, the exo-suit can help the wearer lifting or moving a heavy object by sharing some of the load from the object. The exo-suit includes sensors to sense motion of the wearer, and send a signal to a controller which controls the movement of various components of the exo-suit according to motion of the wearer. The exo-suit provides support for the shoulders, waist and thighs of the wearer, and assists the user in lifting, holding, and moving heavy objects.

Exo-suits have been used to aid in moving tubing and square stocks in plants and factories along with other automotive equipment. The exo-suits require end-of-arm tooling devices to pick up objects. Typically, the end-of-arm tooling devices are specially designed to pick up or lift certain items, but not other items due to their different shapes and sizes. Therefore, a variety of the end-of-arm tooling devices need to be in stock for handling objects having different configurations and sizes, thereby increasing operational costs.

Moreover, the end-of-arm tooling devices for the exo-suits are typically actuated by power sources. When the exo-suits are losing power during material handling, the objects being held by the end-of-arm tooling devices may not be moved efficiently thus disrupting manufacturing operations.

These issues related to the use of end-of-arm tooling devices, such as by way of example those used in exoskeleton suits, are addressed by the present disclosure.

SUMMARY

This section provides a general summary of the disclosure and is not a comprehensive disclosure of its full scope or all of its features.

In one form, a mechanical device for grasping an object is provided that includes a lower arm defining a proximal end portion, a distal end portion, an inner profile, and at least one track disposed along a portion of the lower arm between the proximal end portion and the distal end portion. An upper arm is pivotally connected to the lower arm, the upper arm defining a proximal end portion, a distal end portion, and an inner profile. An actuator is pivotally connected to the proximal end portion of the upper arm, the actuator comprising at least one protrusion slidably disposed within the at least one track of the lower arm.

In variations of this form, which may be implemented individually or in any combination: the mechanical device further comprises a receiver, wherein the lower arm is secured to the receiver at its proximal end portion; the actuator further comprises an upper projection comprising an engagement member disposed at an end portion of the upper projection; the engagement member comprises a profiled geometry configured to mate with the object; the engagement member comprises a magnet; the lower arm comprises opposed arm members, each of the opposed arm members comprising at least one track, and the actuator comprises opposed protrusions, each opposed protrusion being slidably disposed within each of the tracks of the opposed arm members, and the actuator being disposed between the opposed arm members; the at least one track comprises at least one locking portion; the mechanical device further comprises a biasing device operatively connected between the upper arm and the lower arm; the mechanical device further comprises an interchangeable adapter secured to the receiver, wherein the lower arm is secured to the interchangeable adapter; the inner profile of at least one of the upper arm and the lower arm is concave; and at least one of the upper arm and the lower arm comprise inwardly extending distal end portions.

In another form, a mechanical device for grasping an object includes a receiver, a lower arm comprising opposed arm members, each opposed arm member defining a proximal end portion, a distal end portion, an inner profile, and at least one track, the lower arm members being secured to the receiver at their proximal end portions, an upper arm pivotally connected to the lower arm, the upper arm defining a proximal end portion, a distal end portion, and an inner profile, a biasing device operatively connected between the upper arm and the lower arm, and an actuator pivotally connected to the proximal end portion of the upper arm, the actuator comprising opposed protrusions, each opposed protrusion being slidably disposed within each of the tracks of the opposed arm members, and the actuator being disposed between the opposed arm members. The actuator further comprises an upper projection comprising an engagement member disposed at an end portion of the upper projection.

In variations of this form, which may be implemented individually or in any combination, the at least one track of each of the lower arm members comprises at least one locking portion disposed along the at least one track; the engagement member comprises a profiled geometry configured to mate with the object; and the mechanical device further comprises an interchangeable adapter secured to the receiver, wherein the lower arm is secured to the interchangeable adapter.

In still another form, a mechanical device for grasping an object includes a receiver, a lower arm comprising opposed arm members, each opposed arm member defining a proximal end portion, a distal end portion, an inner profile, and at least one track comprising at least one locking portion disposed along the at least one track. The opposed arms of the lower arm are secured to the receiver at their proximal end portions, and an upper arm is pivotally connected to the lower arm. The upper arm defines a proximal end portion, a distal end portion, and an inner profile, and a biasing device is operatively connected between the upper arm and the lower arm. An actuator is pivotally connected to the proximal end portion of the upper arm, the actuator comprising opposed protrusions, each opposed protrusion being slidably disposed within each of the tracks of the opposed arm members, and the actuator being disposed between the opposed arm members.

In variations of this form, which may be implemented individually or in any combination, the engagement member comprises a profiled geometry configured to mate with the object; the inner profile of at least one of the upper arm and the lower arm is concave; and the mechanical device further comprises an interchangeable adapter secured to the receiver, wherein the lower arm is secured to the interchangeable adapter.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
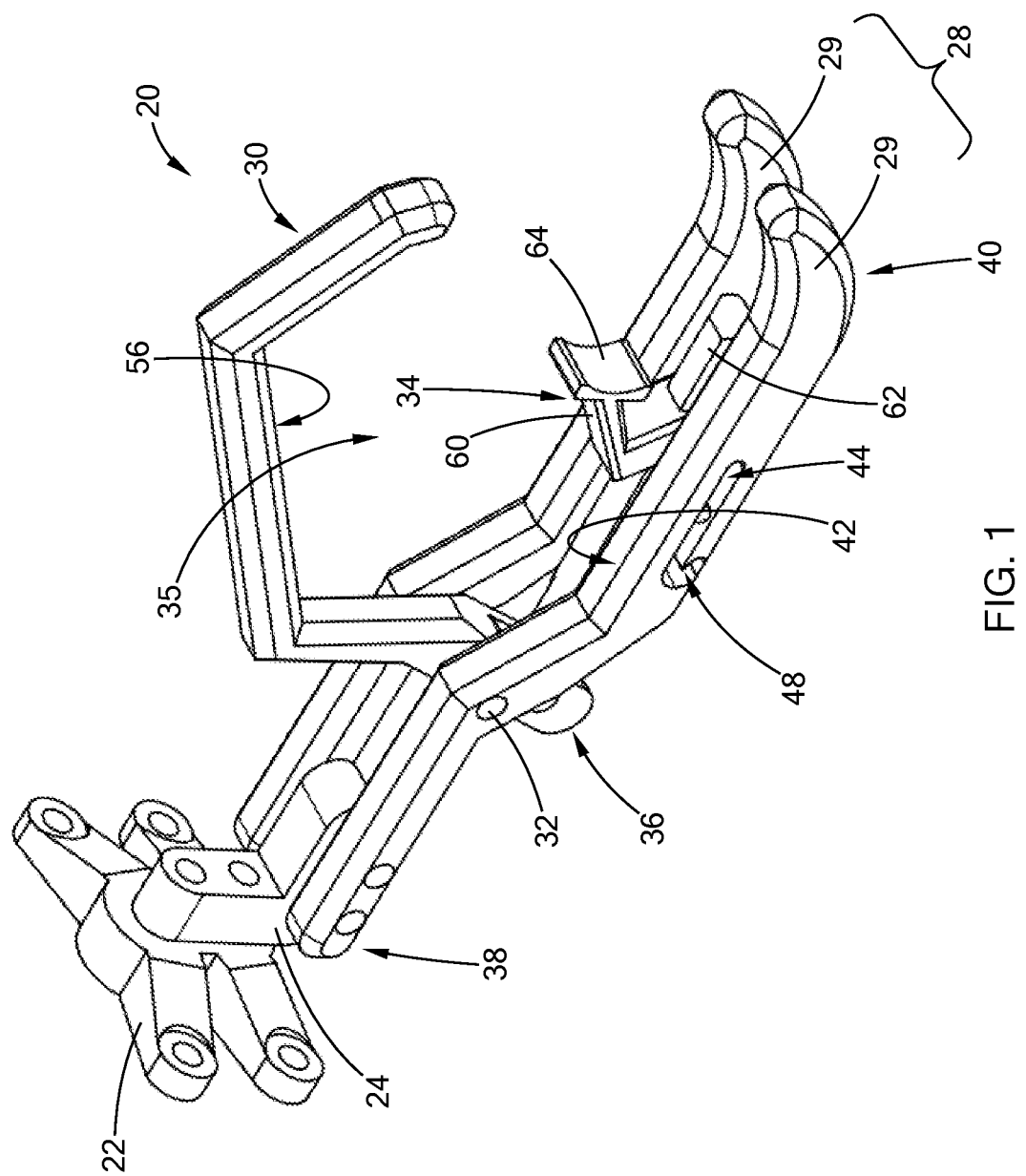
FIG. 1 is a perspective view of a mechanical device for grasping an object constructed in accordance with the teachings of the present disclosure, the mechanical device being shown in an open position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
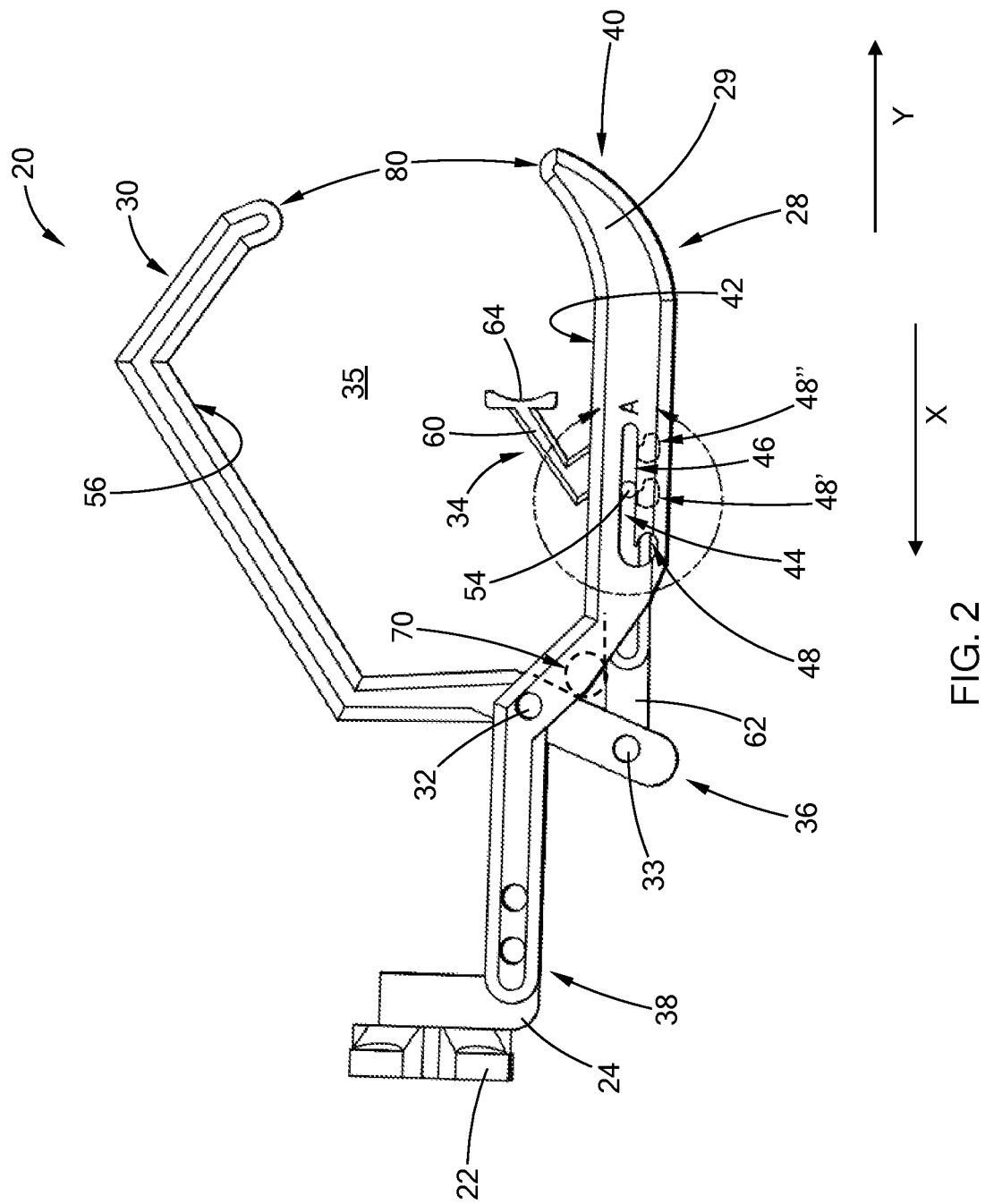
FIG. 2 is a side view of the mechanical device of FIG. 1, shown in the open position.

Referring to FIGS. 1 and 2, a mechanical device for grasping an object is illustrated and generally indicated by reference numeral 20. The mechanical device 20 is constructed so as to be operable without a power source (not shown), however, a power source may be implemented with the mechanical device 20 while remaining within the present disclosure. As shown, the mechanical device 20 in one form includes an optional receiver 22 that is adapted to be secured to an exo-suit (not shown) as an end of arm tool (EOAT). However, it should be understood that the receiver 22 can be connected to any device such as a robotic arm or other structure/device, and the teachings herein should not be limited to an exo-suit application.

The mechanical device 20 also comprises an optional interchangeable adapter 24 secured to the receiver 22. The interchangeable adapter 24 is configured for mounting the mechanical device 20 in a specific orientation and location relative to the receiver 22. The interchangeable adapter 24 may be in the form of an L-bracket as shown, or the interchangeable adapter 24 may take on another configuration such as a straight bracket (not shown). Alternately, the mechanical device 20 may be mounted directly to the receiver 22, or directly to the exo-suit, and the receiver 22 may be formed integrally with the mechanical device rather than being separate components as illustrated herein, while remaining within the scope of the present disclosure.

As further shown, the mechanical device 20 comprises a lower arm 28 secured to the receiver 22 via the interchangeable adapter 24. In this form, the lower arm 28 comprises opposed arm members 29 that are spaced apart as shown. Although two lower arms 28 are shown, it should be understood that only one arm or any number of arm members may be employed while remaining within the scope of the present disclosure. An upper arm 30 is pivotally connected to the lower arm 28, in this form by a pin 32 that extends through the opposed arm members 29 and the upper arm 30. It should be understood that the pin 32 may be replaced with other suitable means to provide a pivot, such as by way of example a bolt (not shown). An actuator 34, which functions to open and close the upper arm 30 of the mechanical device 20 (as described in greater detail below), is pivotally connected to a proximal end portion 36 of the upper arm 30. Similarly, the pivotal connection in this form includes a pin 33 (shown best in FIG. 2), which extends through the upper arm 30 and the actuator 34 as shown. The lower arm 28 and the upper arm 30 thus jointly define a mechanical "claw" configuration with a receiving space 35 therebetween.

The lower arm 28 includes a proximal end portion 38 secured to the receiver 22 (via the interchangeable adapter 24 in this form), a distal end portion 40, and an inner profile 42 as shown. In this form, the inner profile 42 is concave, but it should be understood that the inner profile 42 may take on any number of shapes, including a linear profile (not shown). With a linear profile, additional features may be employed along the profile such as gripping pads or magnets (not shown) in order to better grasp the object. The lower arm 28 further comprises at least one track 44 in the form of a channel extending along a portion of the lower arm 28. In this form, each of the opposed arm members 29 includes a track 44.

Figure 3:
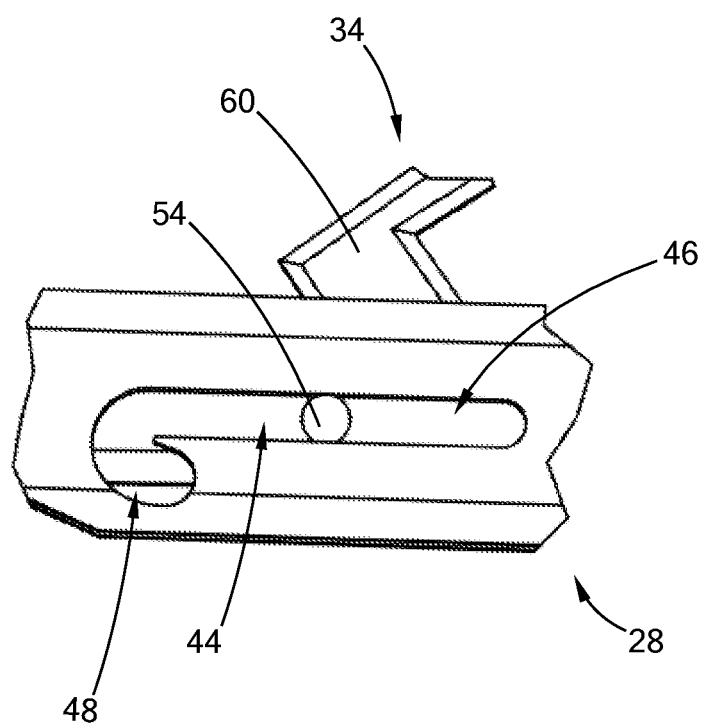
FIG. 3 is an enlarged view of detail A of FIG. 2.

Referring also to FIG. 3, the track 44 in this form includes a straight portion 46 extending in a horizontal direction and at least one locking portion 48 disposed along the track 44. In one form, the locking portion 48 is disposed at a proximal end of the straight portion 46 as shown. The actuator 34 comprises at least one corresponding protrusion 54 that is slidably disposed within the track 44 of the lower arm 28. The locking portion 48 thus functions to lock the protrusion 54 (and thus the actuator 34) in place so that the upper arm 30 can be maintained in the closed position when no force is applied to the actuator 34, as described in greater detail below. While the protrusion 54 is illustrated as an integral feature with the actuator 34, it should be understood that other parts, such as by way of example, a separate bolt (not shown), may be employed while remaining within the scope of the present disclosure. In this form, the locking portion 48 is a curved slot that is contiguous with the track 44 as illustrated. However, it should be understood that a variety of locking means to secure the actuator 34 in place may be employed while remaining within the scope of the present disclosure. For example, multiple locking positions 48' and 48" may be employed along the track 44 while remaining within the scope of the present disclosure.

As further shown, the actuator 34 in this form comprises an upper projection 60 extending from a base 62, and an engagement member 64 disposed at an end portion of the upper projection 60. The engagement member 64 has a profiled geometry to mate with, or generally conform to, the object being grasped. In this form, the engagement member 64 is a concave pad as shown. However, it should be understood that a variety of engagement members may be employed while remaining within the scope of the present disclosure. For example, the engagement member 64 could be in the form of a hook and/or include a magnet. Accordingly, the profiled geometry as illustrated herein should not be construed as limiting the scope of the present disclosure.

The actuator 34 in this form is flanked by, or disposed between, the opposed arm members 29 of the lower arm 28 and includes a pair of opposed protrusions 54 extending laterally from outer surfaces of the base 62. The opposed protrusions 54 in this form are rounded tabs, however, a variety of shapes for the protrusions 54 may be employed while remaining within the scope of the present disclosure. The pair of opposed protrusions 54 are slidably disposed within each of the tracks 44 of the opposed arm members 29 of the lower arm 28.

Referring back to FIG. 2, an optional biasing device 70 (shown in dashed lines) is operatively connected between the upper arm 30 and the lower arm 28. The biasing device 70 in this form is a spring, which may be a torsion spring by way of example, and functions to bias the upper arm 30 in an open position, or away from the lower arm 28. Other biasing devices, such as an elastic member (not shown), may be employed while remaining within the scope of the present disclosure.

Figure 5:
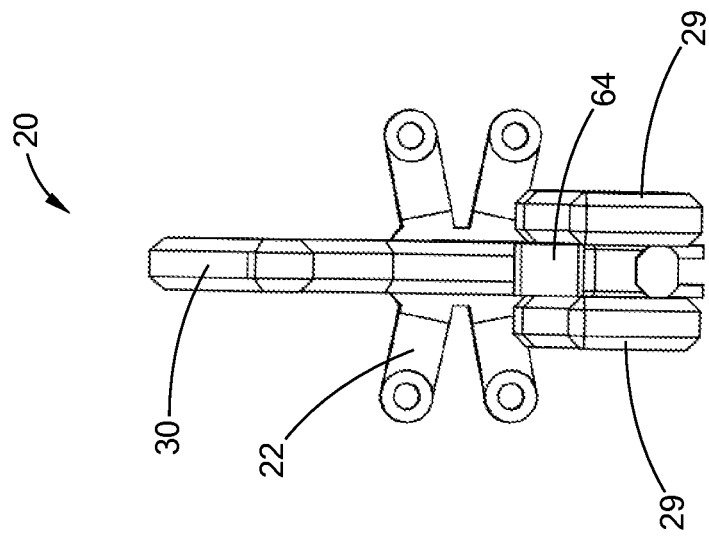
FIG. 5 is a front view of the mechanical device of FIG. 1, shown in the open position.
Figure 4:
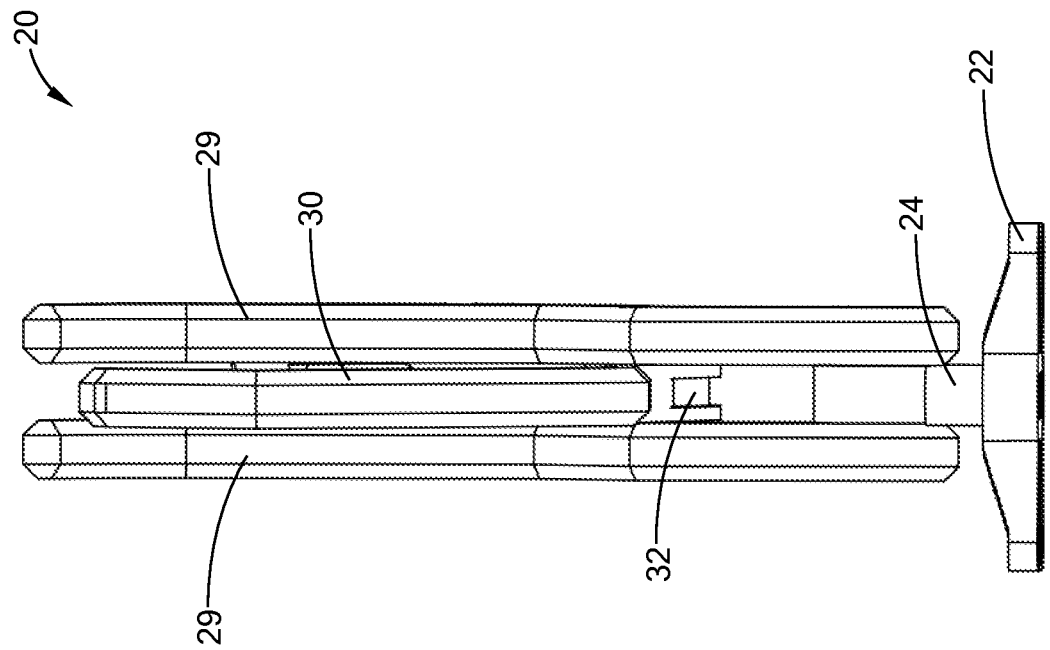
FIG. 4 is a top view of the mechanical device of FIG. 1.

Referring to FIGS. 4 and 5, the upper arm 30 in this form is disposed between the opposed arm members 29 of the lower arm 28. As described in greater detail below, the upper arm 30 rotates during operation about the pin 32.

Referring back to FIGS. 1 and 2, similar to the lower arm 28, the upper arm 30 also defines a concave inner profile 56 as shown. Together, the concave inner profiles 42/56 cooperate to grasp an object as the upper arm 30 closes, as described in greater detail below.

The upper arm 30 is movable between an open position (FIG. 2), where the upper arm 30 is pivoted away from the lower arm 28 to open the receiving space 35 to allow an object to be grasped therein, and a closed position (FIG. 6), where the upper arm 30 is pivoted toward the lower arm 28 to close the receiving space 35. As set forth above, the upper arm 30 is biased away from the lower arm 28 by the biasing device 70 to keep the receiving space 35 open before grasping an object.

Figure 6:
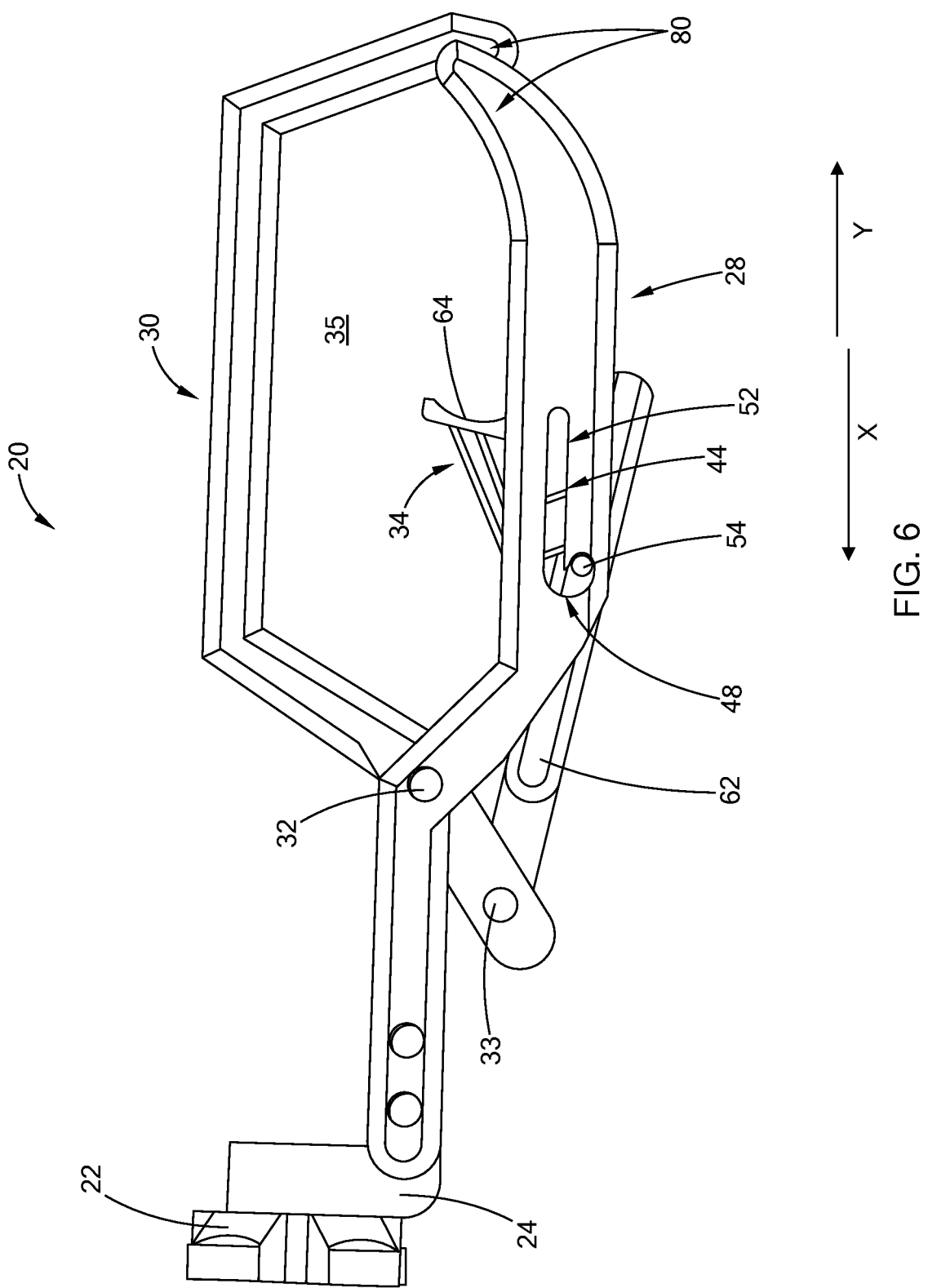
FIG. 6 is a side view of the mechanical device of FIG. 1, showing the mechanical device in a closed and locked position.

Referring specifically to FIGS. 1 and 2, to use the mechanical device 20 to grasp an object (not shown), a user to pushes the engagement member 64 of the actuator 34 against the object. The user continues to push and the protrusions 54 of the actuator 34 slide within the tracks 44 of the lower arm members 29 in a proximal direction X, thus continuing to move the actuator 34 in the proximal direction X. As the protrusions 54 slide within the tracks, the upper arm 30 pivots and rotates down towards the lower arm 28 by virtue of the pivotable connections at pins 32 and 33. The protrusions 54 continue sliding along the straight portion 52 of the tracks 44 until they reach the locking portion 48. The protrusions 54 then drop down into the locking portion 48, which is the curved slot in this form as shown. Since the upper arm 30 is biased away from the lower arm 28, the upper arm 30 becomes locked in place relative to the lower arm 28 once the protrusions 54 drop into the locking portion 48 (FIG. 6). In this locked position shown in FIG. 6, the upper arm 30 is locked in place relative to the lower arm 28, and the object can be captured within the receiving space 35. Advantageously in this form, the upper arm 30 and the lower arm 28 both include inwardly extending distal end portions 80, which function to extend around and trap the object, and close the receiving space 35. It should be understood, however, that these inwardly extending distal end portions 80 are optional and may be included on either or both the upper arm 30 and the lower arm 28 while remaining within the scope of the present disclosure.

To open the mechanical device 20 and release the object, a user once again pushes the engagement member 64 against the object to move the protrusions 54 in the proximal direction X. The mechanical device 20 is then moved downwardly to force the protrusions 54 upwardly, and then the pressure against the object is released, thereby allowing the protrusions 54 to slide in a distal direction Y by virtue of the biasing device 70 acting against the upper arm 30 and the lower arm 28. The upper arm 30 pivots away from the lower arm 28, and the protrusions 54 slide in the distal direction Y to open the mechanical device 20 and release the object.

While the mechanical device 20 illustrated and described herein has its lower arm 28 fixed and its upper arm 30 pivoting/rotating, it should be understood that either or both of the upper arm 30 and lower arm 28 may be pivoting while remaining within the scope of the present disclosure. For example, if the upper arm 30 was fixed and the lower arm 28 was pivoting, the actuator 34 would instead be positioned on the upper arm 30. In another variation, both the upper arm 30 and the lower arm 28 may pivot, and one or more actuators 34 may be employed. These and other variations of the upper arm 30 and lower arm 28 should be construed as falling within the scope of the present disclosure.

The mechanical device 20 is thus actuated mechanically without the use of a power source, such as by way of example, electrical, hydraulic, or pneumatic. However, the mechanical device 20 may be supplemented with such a power source if desired for a particular application, such as lifting an extremely heavy object. The mechanical device 20 of the present disclosure is designed to be a universal tool for grabbing a variety of objects as opposed to being specialized for a single task. Having such a universal grabbing device reduces the time and costs to produce specialized EOAT devices and likewise reduces training costs for such specialized devices.

Thus, the mechanical device 20 functions as a universal grabbing device for handling various tasks and for grabbing a wide range of objects, such as half shafts, wheels, and general tubular and square objects, among others. Different sizes of objects may be grasped by the mechanical device 20 as long as the object fits into the receiving space 35 between the lower arm 28 and the upper arm 30. Accordingly, the size and shape of the receiving space 35 can be altered depending on specific application requirements by modifying the geometry of the lower arm 28 and the upper arm 30. Therefore, it should be understood that the specific geometries as illustrated herein should not be construed as limiting the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A mechanical device for grasping an object, the mechanical device comprising:
    a lower arm defining a proximal end portion, a distal end portion, an inner profile, and at least one track disposed along a portion of the lower arm between the proximal end portion and the distal end portion;
    an upper arm pivotally connected to the lower arm, the upper arm defining a proximal end portion, a distal end portion, and an inner profile; and
    an actuator pivotally connected to the proximal end portion of the upper arm, the actuator comprising at least one protrusion slidably disposed within the at least one track of the lower arm,
wherein the actuator is configured to engage the object causing the upper arm to move,
wherein the actuator further comprises an upper projection comprising an engagement member disposed at an end portion of the upper projection, and
wherein the engagement member comprises a profiled geometry configured to mate with the object.

2. The mechanical device according to claim 1 further comprising a receiver, wherein the lower arm is secured to the receiver at its proximal end portion.

3. The mechanical device according to claim 2, further comprising an interchangeable adapter secured to the receiver, wherein the lower arm is secured to the interchangeable adapter.

4. The mechanical device according to claim 1, wherein the engagement member comprises a magnet.

5. The mechanical device according to claim 1, wherein:
    the lower arm comprises opposed arm members, each of the opposed arm members comprising at least one track; and
    the actuator comprises opposed protrusions, each opposed protrusion being slidably disposed within each of the tracks of the opposed arm members, and the actuator being disposed between the opposed arm members.

6. The mechanical device according to claim 1, wherein the at least one track comprises at least one locking portion.

7. The mechanical device according to claim 1, further comprising a biasing device operatively connected between the upper arm and the lower arm.

8. The mechanical device according to claim 7, wherein the biasing device is a spring.

9. The mechanical device according to claim 1, wherein the inner profile of at least one of the upper arm and the lower arm is concave.

10. The mechanical device according to claim 1, wherein at least one of the upper arm and the lower arm comprise inwardly extending distal end portions.

11. A mechanical device for grasping an object, the mechanical device comprising:
    a receiver;
    a lower arm comprising opposed arm members, each opposed arm member defining a proximal end portion, a distal end portion, an inner profile, and at least one track, the opposed arm members being secured to the receiver at their proximal end portions;
    an upper arm pivotally connected to the lower arm, the upper arm defining a proximal end portion, a distal end portion, and an inner profile;
    a biasing device operatively connected between the upper arm and the lower arm; and
    an actuator pivotally connected to the proximal end portion of the upper arm, the actuator comprising opposed protrusions, each opposed protrusion being slidably disposed within each of the tracks of the opposed arm members, and the actuator being disposed between the opposed arm members,
wherein the actuator further comprises an upper projection comprising an engagement member disposed at an end portion of the upper projection.

12. The mechanical device according to claim 11, wherein the at least one track of each of the opposed arm members comprises at least one locking portion disposed along the at least one track.

13. The mechanical device according to claim 11, wherein the engagement member comprises a profiled geometry configured to mate with the object.

14. The mechanical device according to claim 11, further comprising an interchangeable adapter secured to the receiver, wherein the lower arm is secured to the interchangeable adapter.

15. A mechanical device for grasping an object, the mechanical device comprising:
    a receiver;
    a lower arm comprising opposed arm members, each opposed arm member defining a proximal end portion, a distal end portion, an inner profile, and at least one track comprising at least one locking portion disposed along the at least one track, the opposed arm members being secured to the receiver at their proximal end portions;
    an upper arm pivotally connected to the lower arm, the upper arm defining a proximal end portion, a distal end portion, and an inner profile;
    a biasing device operatively connected between the upper arm and the lower arm; and
    an actuator pivotally connected to the proximal end portion of the upper arm, the actuator comprising opposed protrusions, each opposed protrusion being slidably disposed within each of the tracks of the opposed arm members, and the actuator being disposed between the opposed arm members,
wherein the actuator is configured to engage the object causing the upper arm to move.

16. The mechanical device according to claim 15, wherein the actuator further comprises an engagement member having a profiled geometry configured to mate with the object.

17. The mechanical device according to claim 15, wherein the inner profile of at least one of the upper arm and the lower arm is concave.

18. The mechanical device according to claim 15, further comprising an interchangeable adapter secured to the receiver, wherein the lower arm is secured to the interchangeable adapter.

* * * * *